US010046802B2

(12) United States Patent
Inoue et al.

(10) Patent No.: US 10,046,802 B2
(45) Date of Patent: Aug. 14, 2018

(54) DRIVING ASSISTANCE CONTROL APPARATUS FOR VEHICLE

(71) Applicant: TOYOTA JIDOSHA KABUSHIKI KAISHA, Toyota-shi, Aichi-ken (JP)

(72) Inventors: Shintaro Inoue, Kanagawa-ken (JP); Hideo Inoue, Kanagawa-ken (JP); Pongsathorn Raksincharoensak, Fuchi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 144 days.

(21) Appl. No.: 15/275,993

(22) Filed: Sep. 26, 2016

(65) Prior Publication Data

US 2017/0088174 A1  Mar. 30, 2017

(30) Foreign Application Priority Data

Sep. 28, 2015 (JP) .................................. 2015-190252

(51) Int. Cl.
| | |
|---|---|
| *B62D 15/02* | (2006.01) |
| *B62D 5/04* | (2006.01) |
| *B62D 6/00* | (2006.01) |
| *B62D 6/10* | (2006.01) |
| *B60T 8/1755* | (2006.01) |

(52) U.S. Cl.
CPC .......... *B62D 15/025* (2013.01); *B60T 8/1755* (2013.01); *B62D 5/0457* (2013.01); *B62D 6/003* (2013.01); *B62D 6/10* (2013.01); *B60T 2260/02* (2013.01)

(58) Field of Classification Search
CPC .. B62D 15/025; B62D 5/0457; B62D 5/0463; B62D 6/003; B62D 6/10; B60T 8/1755; B60T 2260/02; B60W 2520/125
USPC .......................................................... 701/41
See application file for complete search history.

(56) References Cited

U.S. PATENT DOCUMENTS

| | | | |
|---|---|---|---|
| 8,515,591 B2 * | 8/2013 | Yokota ................... | B60W 40/11 701/1 |
| 8,823,305 B2 * | 9/2014 | Niimi .................... | B62D 5/0481 318/400.01 |
| 9,446,792 B2 * | 9/2016 | Takeda ................... | B62D 6/008 |

(Continued)

FOREIGN PATENT DOCUMENTS

| | | |
|---|---|---|
| JP | 2000-072021 A | 3/2000 |
| JP | 4173292 B2 | 10/2008 |
| JP | 2010-042741 A | 2/2010 |

*Primary Examiner* — Krishnan Ramesh
(74) *Attorney, Agent, or Firm* — Sughrue Mion, PLLC

(57) ABSTRACT

An apparatus includes a steering assist torque determination unit and a steering assist torque control unit. The steering assist torque determination unit determines a steering assist torque including a first component that is determined on the basis of a deviation between an actual steering angle and a target steering angle for achieving a target path determined irrespective of driver's steering. The steering assist torque control unit controls a steering assist mechanism such that the steering assist torque is applied. The ratio of the magnitude of the first component of the steering assist torque to the deviation between the target steering angle and the actual steering angle is determined on the basis of the magnitude of the deviation between the steering assist torque and the driver's steering torque in a past predetermined period.

10 Claims, 4 Drawing Sheets

(56) References Cited

U.S. PATENT DOCUMENTS

| | | | | |
|---|---|---|---|---|
| 9,738,307 B2* | 8/2017 | Endo | .................... | B62D 5/0466 |
| 2012/0173040 A1* | 7/2012 | Yokota | .................... | B60W 40/11 |
| | | | | 701/1 |
| 2012/0299517 A1* | 11/2012 | Niimi | .................... | B62D 5/0463 |
| | | | | 318/432 |
| 2013/0226411 A1* | 8/2013 | Hirano | .................... | B62D 6/00 |
| | | | | 701/42 |
| 2015/0274203 A1* | 10/2015 | Takeda | .................... | B62D 6/008 |
| | | | | 701/42 |
| 2016/0001814 A1* | 1/2016 | Endo | .................... | B62D 5/0466 |
| | | | | 701/41 |
| 2016/0362102 A1* | 12/2016 | Honda | .................... | B60K 1/02 |

* cited by examiner

DRIVING ASSISTANCE CONTROL APPARATUS FOR VEHICLE

INCORPORATION BY REFERENCE

The disclosure of Japanese Patent Application No. 2015-190252 filed on Sep. 28, 2015 including the specification, drawings and abstract is incorporated herein by reference in its entirety.

BACKGROUND

1. Technical Field

The disclosure relates to an apparatus for assisting in driving a vehicle, such as an automobile, and, more particularly, to an apparatus that performs driving assistance in a vehicle including a steering assist mechanism while coordinating control for operating the steering assist mechanism with driver's steering operation.

2. Description of Related Art

In the field of control for driving a vehicle, such as an automobile, there are suggested various types of driving assistance systems or automated driving systems for a vehicle, which control a steering mechanism or acceleration/deceleration mechanism of the vehicle so that a driver is allowed to more easily drive the vehicle. For example, in lane keeping assist (LKA) control, in order to prevent a departure of a moving vehicle from a lane, a driver is warned with a warning buzzer, or the like, when the vehicle is about to depart from the lane. In addition, when radar cruise control is active, speed control for keeping a vehicle speed at a set speed is executed without continuous depression of an accelerator pedal, and the driver is assisted in steering such that the vehicle travels along the lane. In intelligent parking assistant (IPA), steering assist is performed at the time of parallel parking or garage parking. Japanese Patent No. 4173292 describes a configuration that, at the time of a lane change, changes steering reaction force of a steering wheel such that a steering angle is brought close to an optimal steering angle calculated on the basis of surrounding environment information and thus makes it easy for a driver to adjust the steering angle to the optimal steering angle. Japanese Patent Application Publication No. 2000-72021 (JP 2000-072021 A) describes a technique for driving assistance. This technique is configured to determine a target steering angle on the basis of information around a vehicle, increases steering assist force in the same direction as the target steering angle and then reduces steering assist force in a direction opposite to the target steering angle. Furthermore, Japanese Patent Application Publication No. 2010-042741 (JP 2010-042741 A) describes a technique for driving assistance. This technique is configured to calculate a lateral acceleration correction amount for a vehicle to head toward a target position determined by using an image from an in-vehicle camera, detects a driver's steering amount, and, when the steering amount is smaller than a predetermined threshold, decelerates the vehicle and then executes steering control such that the lateral acceleration correction amount is achieved; whereas, when the steering amount is larger than the predetermined threshold, executes steering control and then decelerates the vehicle such that the lateral acceleration correction amount is achieved.

In the above-described driving assistance systems or automated driving systems, more efficient driving of a vehicle is expected to be possible through control based on a system, that is, control based on input by a machine (input of a target set by a machine on the basis of mechanical input, such as surrounding environment information) in comparison with control based on input by a driver (input of steering by a driver or input of a target set on the basis of the input of steering by a driver). A weight reduction of a vehicle is expected from the viewpoint of environmental issues and the need for low fuel consumption and low electric power consumption. However, in the case of a light-weight vehicle, there is a concern about deterioration of stability against cross wind or a road surface disturbance because of reasons, such as small moment of inertia in a yaw direction and deterioration of aerodynamic drag. As a result, usability of driving assistance control based on mechanical input increases. However, if driving assistance control is configured to control the movement of a vehicle on the basis of only mechanical input and not accept driver input (configured to perform complete automated driving), when the movement of the vehicle is different from a movement that is expected from driver's steering operation, the driver can experience a strong feeling of strangeness in that regard. Therefore, in an actual driving assistance system, it is desirable to obtain the advantageous effect of control based on mechanical input while accepting not only mechanical input but also driver input, coordinating both inputs with each other and then allowing both driver input and mechanical input to be reflected in the movement of the vehicle. In terms of this point, in the case of an existing known driving assistance system, such as LKA control and IPA control, if a driver makes an override, such as steering input and accelerator/brake pedal input, while automated driving control is being executed by the driving assistance system, the system stops active control based on mechanical input, so there are many cases where the advantageous effect of control based on mechanical input are not obtained at all.

When the above-described driving assistance system is configured to execute control based on mechanical input while accepting driver input, how to coordinate control based on mechanical input with control based on driver input, that is, how both pieces of control are caused not to conflict with each other, is a challenge. In a state of movement of a vehicle, such as a steering angle, if the difference between a state that control based on mechanical input intends to achieve and a state assumed or expected by a driver is large, the driver experiences a strong feeling of strangeness. As a result, the driver feels that control based on mechanical input is a burden or a nuisance, and, in an extreme case, the driver may steer in a direction opposite to a direction that is intended by mechanical input (in an inefficient direction).

As for one of measures for avoiding the above-described situation as much as possible, that is, for coordinating control based on mechanical input with control based on driver input, it is conceivable to inform a driver of an intention of control based on mechanical input (that is, the direction and/or magnitude of control operation over the movement of a vehicle) and share the intention of control based on mechanical input with the driver. When the driver knows the intention of control based on mechanical input, a situation in which the movement of the vehicle, intended by control based on mechanical input, runs counter to driver's assumption is reduced. It is understood that this reduces a feeling of strangeness that is experienced by the driver. If the driver realizes that driving of the vehicle, which is achieved by control based on mechanical input, is more ideal and understands an intention of control based on mechanical input, the reliability of the system increases, and the degree of reliance on the system increases, with the result that the driver performs input so as to follow control based on mechanical input, that is, control based on mechanical input and control based on driver input are executed in a coordinated manner.

It is conceivable that a driver is informed of an intention of control based on mechanical input by display (visual sense) or sound (audio sense). However, when assistance of the driving assistance system is particularly for steering of the vehicle, the driver may be informed through a steering wheel gripped by the driver. In the case of driving assistance in steering the vehicle, when the driving assistance system is configured to, at the time when additional steering torque (steering assist torque) is applied in a direction in which the steering angle is controlled in order to cause the vehicle to follow an ideal path, accept driver input, that is, steering torque that is applied through the steering wheel by the driver (driver's steering torque), for steering of the vehicle and then control the steering angle by using the steering assist torque and the driver's steering torque, a steering device for a vehicle, in which the steering wheel and wheels are mechanically directly coupled to each other, is mounted (alternatively, the steering wheel and the wheels may be mechanically directly coupled to each other only when the system accepts the driver's steering torque). With this configuration, the steering assist torque is transmitted to the steering wheel because the steering wheel and the wheels are mechanically directly coupled to each other, so the steering wheel serves as an informing unit that informs the driver of operation that control based on mechanical input intends to perform. Thus, the driver is allowed to feel the direction and magnitude of steering assist torque via a hand gripping the steering wheel. When the driver performs steering such that the vehicle appropriately follows to approach an ideal path that is a target of control based on mechanical input with the aid of the direction and magnitude of steering assist torque, it is expected to achieve a target state of control based on mechanical input. In this manner, the steering device in which the steering wheel and the wheels are mechanically directly coupled to each other is mounted on the vehicle, and the vehicle is configured such that the driver is allowed to sense steering assist torque through the steering wheel. In this state, when the direction and magnitude of steering assist torque that represents an intention of control based on mechanical input are transferred to the driver, the driver understands and relies on the intention of control based on mechanical input, and performs steering so as to follow the direction and magnitude of steering assist torque. As a result, in control over the steering angle, control based on mechanical input through steering assist torque and control based on driver input through driver's steering torque that the driver applies through the steering wheel are executed in a coordinated manner and do not conflict with each other.

Incidentally, there are individual differences in driving characteristic or driving skill level among drivers, and, even in the case of the same driver, the driving characteristic or the driving skill level can change depending on whether the driver is accustomed to driving on the course of a traveling road, a time period of driving, the length of time, physical condition, and the like. The extent of accuracy in the case where a driver senses steering assist torque through the steering wheel and then applies steering torque following the steering assist torque depends on the driving characteristic of the driver, particularly, the driving skill level of the driver. That is, when driving assistance for drivers of various driving skill levels is considered, adequate extent of assistance differs depending on how high the driving skill level is. Therefore, in the above-described driving assistance made by applying steering assist torque, it is desirable that the extent or mode of the driving assistance be allowed to be changed or adjusted depending on the driving characteristic or driving skill level of a driver.

When the extent or mode of applying steering assist torque is changed depending on the driving characteristic or driving skill level of a driver, it is required to understand the driving characteristic or driving skill level of a driver. In terms of this point, in the case of the configuration in which a driver senses the direction and magnitude of steering assist torque that appears on the steering wheel and applies steering torque following the steering assist torque, it is possible to evaluate the driving characteristic or driving skill level of the driver on the basis of a deviation between the steering assist torque and the driver's steering torque. For example, as the driving skill level of a driver becomes higher, the manner of applying steering torque makes it possible to bring an actual driving state to a state closer to ideal driving that is a target of control based on mechanical input, and it is presumable that the manner of applying steering torque accurately follows the direction and magnitude of steering assist torque and reduces a deviation between steering assist torque and driver's steering torque. Therefore, a value that is determined on the basis of a deviation between steering assist torque and driver's steering torque can be used as an index value of driving skill level. Such findings are utilized in the invention.

SUMMARY

The invention provides an apparatus that coordinates control based on mechanical input and control based on driver input with each other to allow the driver input to be reflected in the movement of a vehicle and that provides advantageous effects of control based on mechanical input in a driving assistance system for steering of the vehicle.

The invention provides a configuration that is able to change or adjust the extent or mode of applying steering assist torque through control based on mechanical input in response to a driving characteristic or driving skill level of a driver in a driving assistance system for steering of the above-described vehicle.

An aspect of the invention provides a driving assistance control apparatus for a vehicle including a steering assist mechanism in a steering device in which steered wheels and a steering wheel are mechanically directly coupled to each other. The driving assistance control apparatus includes: a steering assist torque determination unit that determines a steering assist torque on the basis of a steering angle deviation, the steering angle deviation being obtained by subtracting an actual steering angle from a target steering angle, the target steering angle being determined irrespective of driver's steering so as to achieve a target path of the vehicle, the steering assist torque including a first component that varies with a variation in the steering angle deviation and that acts in a direction to reduce the steering angle deviation; and a steering assist torque control unit that controls the steering assist mechanism such that the steering assist torque is applied to the steering device. The steering assist torque determination unit includes an interference degree determination unit and a first component ratio determination unit, the interference degree determination unit determines an interference degree on the basis of a magnitude of a steering torque deviation between the steering assist torque in a past predetermined period and a driver's steering torque applied by the driver of the vehicle, the interference degree increases as the magnitude of the steering torque deviation increases, the first component ratio determination unit determines the ratio of a magnitude of the first component of the steering assist torque to the steering angle deviation on the basis of the interference degree.

In the above configuration, as is well known in this field, the steering assist mechanism may be a device that, at the time when a driver performs steering with the use of a steering wheel, or the like, assists the driver in steering by adding steering assist torque, and may be, for example, a power steering device, or the like. The steering assist torque is a torque that is applied by the steering assist mechanism. The driving assistance control is control for assisting in causing a vehicle to travel along a trajectory or direction that is determined to be appropriate on the basis of surrounding environment information, or the like, by controlling a turning angle or turning direction (steering torque, yaw rate, yaw moment, and the like) and/or speed, or acceleration/deceleration of the vehicle. For example, the driving assistance control may be configured to, when there is an obstacle on a traveling road of a moving vehicle, set an appropriate travel route (future trajectory) such that the vehicle travels while avoiding the obstacle, and control the operation of the steering device of the vehicle such that the vehicle is driven appropriately along the future trajectory. The target path is an appropriate path along which the vehicle should be caused to travel through the driving assistance control. Typically, the travel path may be, for example, a travel path of the vehicle, which is determined by any technique, by using information around the vehicle, that is, information that is obtained from a camera, a radar sensor, a GPS device, or the like, or information of the above-described future trajectory, irrespective of actual driver's steering. More specifically, for example, a target arrival position of the vehicle is initially determined on the basis of the information around the vehicle or the future trajectory, and then, as for a path from the current position of the vehicle to the target arrival position, the target path is determined in accordance with a selected algorithm, or the like, for example, in accordance with a selected condition that is important in control, such as a path along which the vehicle reaches the target arrival position in the shortest time and a path along which the vehicle reaches the target arrival position with the smallest energy consumption. In this case, the target steering angle is a steering angle that is sequentially required in process in which the vehicle is caused to move along the target path. In calculating the target steering angle, typically, a displacement (target displacement) that is required of the vehicle momentarily at the time when the vehicle is caused to move along the target path, for example, a target lateral displacement of the vehicle, is determined, and a target steering angle is calculated as a steering angle for achieving the target displacement. The target steering angle may be, for example, a steering angle on an assumption that the target path is achieved by the normative driver model. The normative driver model may be the model of a driver having an ideal response characteristic in driving the vehicle, and the ideal response characteristic may be set as needed by a designer of the apparatus.

With the configuration of the apparatus according to the invention, as is understood from the above description, in the vehicle to which the apparatus according to the invention is applied, the steering device has a configuration in which the steered wheels and the steering wheel are mechanically directly coupled to each other. In a state where steering resulting from applying steering torque to the steering wheel by the driver is reflected in an actual turning angle, control for achieving the target path of the vehicle, determined irrespective of driver's steering, that is, control based on mechanical input, is executed by applying the steering assist torque with the use of the steering assist mechanism (that is, control based on driver input and control based on mechanical input can be executed over the steering device at the same time). Here, in the case of the invention, as described above, the steering assist torque includes the first component that varies with a variation in the deviation on the basis of the deviation and that acts in a direction to reduce the steering angle deviation, the deviation is obtained by subtracting the actual steering angle of the vehicle from the target steering angle for achieving the target path of the vehicle, and the first component of the steering assist torque changes so as to vary with a deviation of the actual steering angle from the target steering angle. Therefore, larger steering assist torque is applied as the deviation of the actual steering angle from the target steering angle increases. As a result, as the deviation of the actual steering angle from the target steering angle increases, driving assistance is provided at a higher extent. As the steering assist torque is applied to the steering device by the steering assist mechanism, the driver gripping the steering wheel senses the steering assist torque because the steered wheels and the steering wheel are mechanically directly coupled to each other. Because the steering assist torque is a controlled amount of control based on mechanical input, determined irrespective of driver's steering, the driver senses the steering assist torque, that is, the direction and magnitude of operation that the control based on mechanical input performs, through the steering wheel. Thus, the driver understands an intension of the control based on mechanical input. In this manner, it is expected to reduce a feeling of strangeness that is experienced by the driver from the control based on mechanical input. When the driver understands the direction and magnitude of the steering assist torque (the intension of control based on mechanical input), the driver is expected to perform steering in order to move the steering wheel following the control with the aid of the steering assist torque. Thus, the control based on mechanical input and the control based on driver input actuate the steering device in a coordinated manner.

In the case of the invention, in the configuration in which the above-described driver is allowed to apply steering torque following control based on mechanical input, the magnitude of the first component of steering assist torque is determined depending on a value called interference degree that is an index value of the driving skill level of the driver, as described above. As described above, the interference degree is defined as a value that increases as the magnitude of a steering torque deviation increases on the basis of the magnitude of the steering torque deviation between the steering assist torque and the steering torque applied by the driver of the vehicle (driver's steering torque) in the past predetermined period. As already described, generally, the direction and magnitude of steering torque that is input by a driver vary depending on the driving skill level of the driver, and the followability of driver's steering torque to steering assist torque depends on the driving skill level of the driver. Therefore, the magnitude of the steering torque deviation between the steering assist torque and the driver's steering torque is allowed to be referenced as an index value of the driving skill level of a driver. Therefore, in the apparatus according to the invention, as described above, as for the first component of the steering assist torque, that is, the component that is determined on the basis of the steering angle deviation, the ratio of the magnitude of the first component to the steering angle deviation is determined by further referencing the interference degree that is determined on the basis of the steering torque deviation. Thus, the first component that depends on the steering angle deviation within the steering assist torque can be adjusted so as to be adapted to the driving skill level of a driver at a higher extent.

Usually, in the case of a driver having a high driving skill level, the driver's steering torque that is input by the driver is accurate, so the followability of the driver's steering torque to the steering assist torque is high (the direction and magnitude of the driver's steering torque are close to those of the steering assist torque), and the magnitude of the steering torque deviation is expected to reduce; whereas, in the case of a driver having a low driving skill level, there are many cases where the driver's steering torque is not so accurate, so it is assumed that the magnitude of the steering torque deviation increases. Therefore, driving assistance should be provided to a driver having a low driving skill level at a higher extent than to a driver having a high driving skill level, so, in the above-described configuration, the ratio of the magnitude of the first component of the steering assist torque to the steering angle deviation at the time when the interference degree is large is increased as compared to when the interference degree is small. Thus, larger steering assist torque that is applied as driving assistance may be applied to a driver having a low driving skill level than to a driver having a high driving skill level.

Regarding the above-described interference degree, the driving skill level that is indicated by the value of the interference degree should be evaluated before the steering assist torque is actually applied, so the magnitude of the steering torque deviation that is referenced in determining the interference degree is that in a past predetermined period. Any past predetermined period may be selected as long as it is possible to evaluate the driving skill level of a driver. For example, when the driving assistance control is constantly executed during traveling of the vehicle, the magnitude of the steering torque deviation in a period before the steering assist torque is determined may be employed. In this case, the ratio of the magnitude of the first component of the steering assist torque to the steering angle deviation may be sequentially changed; however, if the ratio is frequently changed, there is a possibility that the stability of control decreases. Therefore, for example, the ratio of the magnitude of the first component of the steering assist torque to the steering angle deviation may be updated at intervals of a selected predetermined period from the start of driving. In another mode, when the driving assistance control is configured to be executed in a specific situation in which the necessity or usability of the driving assistance control is high, such as a situation in which the vehicle avoids an obstacle in the traveling direction, the interference degree may be determined by referencing the magnitude of the steering torque deviation at the time when the vehicle has avoided an obstacle last time. In any mode, when there is no history of the magnitude of the steering torque deviation to be referenced, for example, the interference degree in the case of a prepared average driving skill level may be used. For example, an integral value of the magnitude or square of the steering torque deviation between the steering assist torque and the driver's steering torque in the past predetermined period or a functional value of the magnitude or square of the steering torque deviation may be employed as a more specific value of the interference degree. This is because an integral value allows the driving skill level of each driver to be evaluated more accurately than an instantaneous value having variations.

In the above-described configuration according to the invention, the steering assist torque determination unit may be configured to, when the magnitude of the steering angle deviation is smaller than a dead band threshold, set the first component of the steering assist torque to zero, and, in this case, the dead band threshold may be set on the basis of the interference degree. When the magnitude of the steering angle deviation is small, it means that the actual steering angle is close to the target steering angle, so the necessity of driving assistance is low. When the amount of actual steering angle to be adjusted is small, it is difficult for the driver to adjust steering operation, and, in some cases, driver's steering can be excessive, resulting in an increased steering angle deviation (control hunting can occur). Therefore, as described above, when the magnitude of the steering angle deviation is small and is smaller than a predetermined threshold (dead band threshold), a dead band in which the first component of the steering assist torque is set to zero is provided, and, in a range in which the magnitude of the steering angle deviation is small where driver's adjustment of the steering angle is difficult, the first component of the steering assist torque may be configured not to be applied. In the above configuration, the accuracy of adjustment of the steering angle by a driver depends on the driving skill level, and the width of the range in which it is difficult for a driver to adjust the steering angle varies, so the dead band threshold that defines the range of the dead band is also determined on the basis of the interference degree that indicates the above-described driving skill level. Thus, the width of the dead band can be adjusted so as to be adapted to the driving skill level of a driver at a higher extent. Usually, the accuracy of adjustment of the steering angle is lower when a driver has a low driving skill level than when a driver has a high driving skill level, the width of variation in adjustable steering angle increases, so (when the same dead band width is set) control hunting is easier to occur when a driver has a low driving skill level. Therefore, the dead band threshold in the case where the interference degree is large, that is, the driving skill level of a driver is low, may be increased as compared to the case where the interference degree is small, that is, the driving skill level of a driver is high. Thus, a driver having a low driving skill level may also be configured to reduce the possibility that control hunting occurs.

In the above-described configuration according to the invention, in addition to the first component that is determined on the basis of the steering angle deviation, the steering assist torque may include a second component that varies with a variation in steering angular velocity deviation on the basis of the steering angular velocity deviation and that acts in a direction to reduce the steering angular velocity deviation, the steering angular velocity deviation is obtained by subtracting a rate of change in the actual steering angle from a rate of change in the target steering angle. With the above configuration, the driver is allowed to apply steering torque so as to follow the steering assist torque, including the manner of changing the steering angle in control based on mechanical input, so the driver is allowed to perform steering at a further ideal steering speed. At this time, as in the case of the first component that is determined on the basis of the steering angle deviation, the response of a driver to the steering assist torque varies depending on the driving skill level of the driver. Therefore, the steering assist torque determination unit may include a second component ratio determination unit that determines the ratio of a magnitude of the second component to the steering angular velocity deviation on the basis of the interference degree. Thus, the ratio of the magnitude of the second component to the steering angular velocity deviation may also be adjusted so as to be adapted to the driving skill level of the driver. In terms of this point, generally, a driver having a high driving skill level presumably makes a more accurate manner of changing the steering angle than a driver having a low driving skill level, so the ratio of the magnitude of the second component to the steering angular velocity deviation at the time when the interference degree is large is increased as compared to when the interference degree is small. Thus, when the driving skill level of a driver is low, the magnitude of the second component of the steering assist torque is also relatively increased. Thus, the steering assist torque that is applied as driving assistance may be increased for a driver having a low driving skill level as compared to a driver having a high driving skill level. In the case of the second component, as well as the first component, a dead band may be provided in a range in which the steering angular velocity deviation is close to zero, and the width of the dead band may be changed on the basis of the interference degree.

When the vehicle to which the apparatus according to the invention is applied includes a braking and driving force distribution mechanism for right and left wheels, the braking and driving force distribution mechanism for the right and left wheels may also be advantageously utilized for the driving assistance control according to the invention. The braking and driving force distribution mechanism for the right and left wheels may be a mechanism that is able to freely adjust the magnitude and/or ratio of braking and driving force in each of the right and left wheels of the vehicle. A mechanism using various types of right and left driving force distribution differentials that distribute driving force, which is transmitted from one prime mover (engine or motor) via a propeller shaft, to the right and left wheels at a selected ratio, a mechanism that controls the distribution of braking and driving force by freely adjusting braking force of each of the right and left wheels or a mechanism that is able to independently control right and left braking and driving forces by the use of in-wheel motors may be employed as the braking and driving force distribution mechanism for the right and left wheels. In this manner, when the braking and driving force distribution mechanism for the right and left wheels is utilized in the driving assistance control, the apparatus according to the invention may further include a right and left braking and driving force difference determination unit and a right and left braking and driving force difference control unit, the right and left braking and driving force difference determination unit determines a target braking and driving force difference between the right and left wheels for applying yaw moment to the vehicle in a direction of the actual turning angle on the basis of the actual steering angle, the right and left braking and driving force difference control unit controls the braking and driving force distribution mechanism for the right and left wheels such that the target braking and driving force difference between the right and left wheels is applied. With the above configuration, yaw moment that turns the vehicle in the direction of the actual steering angle is generated by the braking and driving force difference between the right and left wheels. As a result, as will be described in detail in an embodiment later, the braking and driving force difference between the right and left wheels applies the action of reducing self-aligning torque that occurs in tires in a direction opposite to the turning direction. As the self-aligning torque is reduced, it becomes easy to adjust steering torque that is required to perform steering for displacing the actual steering angle to the target steering angle, improvement in followability to the steering assist torque by a driver is expected. The braking and driving force difference between the right and left wheels may also be adjusted so as to be adapted to the driving skill level of the driver. In terms of this point, as already described above, generally, a driver having a low driving skill level performs less accurate steering than a driver having a high driving skill level. Therefore, it is desirable to provide driving assistance to a driver having a low driving skill level through the braking and driving force difference between the right and left wheels at a higher extent, so the yaw moment that is applied at a target braking and driving force difference between the right and left wheels at the time when the interference degree is large may be increased as compared to when the interference degree is small.

In this manner, in the invention, in the configuration in which control based on mechanical input and control based on driver input can be executed at the same time for steering of the vehicle, the driver senses the steering assist torque that is applied by the control based on mechanical input such that the vehicle is caused to travel along a more ideal target path, and the driver is allowed to perform steering at its own intension so as to follow the control based on mechanical input with the aid of the steering assist torque. In the above configuration, when the actual steering angle is adjusted to the target steering angle in order to cause the vehicle to travel along the target path as much as possible, the steering assist torque initially acts on the steering device in response to a difference between the target steering angle and the actual steering angle, and also appears on the steering wheel. As a result, the driver senses the direction and magnitude of the steering assist torque, and applies steering torque by rotating the steering wheel following the steering assist torque. Thus, the steering assist torque and the driver's steering torque act on the steering device. As the actual steering angle approaches the target steering angle as a result of these steering torques, the steering assist torque is gradually reduced. As the actual steering angle roughly reaches the target steering angle (in the case where a dead band is provided, when the steering angle deviation falls within the dead band), the steering assist torque becomes zero. Thus, the driver recognizes that the actual steering angle roughly coincides with the target steering angle, and stops applying the driver's steering torque. In this manner, the actual steering angle is substantially brought into coincidence with the target steering angle, and traveling of the vehicle along the target path is achieved. That is, with the above configuration, driving of the vehicle, which is intended by control based on mechanical input, is achieved as a result of executing control based on driver input and control based on mechanical input in a coordinated manner without any conflict. At this time, the magnitude of the steering assist torque is further adjusted on the basis of the interference degree that indicates the driving skill level of the driver, so the magnitude of the steering assist torque that is applied as driving assistance is further adapted to the driving skill level of the driver, and improvement in coordination between mechanical input and driver input is expected. When the steering assist torque is determined by using the characteristic of the normative driver model in the above control, the driver corrects his or her own steering such that the steering gets close to driving of the normative driver model, so it is expected to obtain a feeling that the driver can drive the vehicle well.

Incidentally, in the invention, control based on mechanical input initially sets a target steering angle for the target path, and steering assist torque is generated such that an actual steering angle coincides with the target steering angle.

That is, in brief, the control according to the invention may be regarded as feedback control over the steering angle. The reason why the steering angle is used as a target value is to accurately determine a target of the control. Generally, in a steering device, a torque loss occurs due to viscosity and friction in its internal structure. If steering torque is employed as a target value of control, a torque loss that is difficult to be calculated or estimated needs to be considered. Therefore, it becomes difficult to accurately calculate a target value of steering torque for a target path. In contrast, when a steering angle is used as a target value, it is not required to consider a torque loss, or the like, and a target of control is accurately determined. As a result, it is possible to cause a vehicle to follow a target path through control based on mechanical input with high accuracy.

In the control according to the invention, a command value to be required for the steering device is given as a torque for steering. The reason is that, if an operation command is issued to the steering device such that the steering angle coincides with the target steering angle, a steering angle that falls outside the target steering angle is not permitted and, as a result, there is a possibility that the driver significantly experiences a feeling of strangeness. When a command value to be required for the steering device is issued as a steering torque, and when the actual steering angle deviates from the target steering angle, the steering assist torque is generated, and the driver senses the steering assist torque as reaction force. However, the driver is allowed to bring the steering angle to an angle intended by the driver, and there is room for allowing driver's intension to be reflected, so it is expected that an increase in a feeling of strangeness that is experienced by the driver is reduced.

Other objects and advantages of the invention are become apparent from the following description of an embodiment of the invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Configuration of Vehicle

Figure 1A:
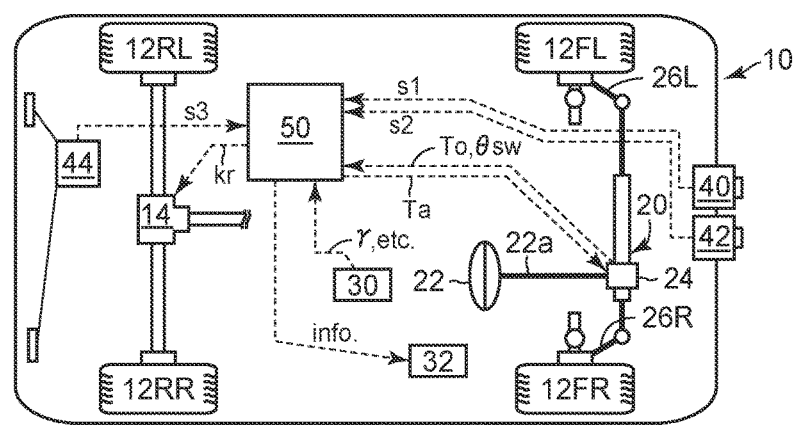
FIG. 1A is a schematic view of a vehicle on which an embodiment of the driving assistance control apparatus for a vehicle according to the invention is mounted.

As shown in FIG. 1A, a vehicle 10, such as an automobile, in which an embodiment of the driving assistance control apparatus according to the invention is incorporated, includes right and left front wheels 12FR, 12FL, right and left rear wheels 12RR, 12RL, a drive system device (partially shown), a steering device 20 and a brake system device (not shown) in an ordinary mode. The drive system device generates braking and driving force in each wheel (in the illustrated example, only the rear wheels because the vehicle is a rear-wheel drive vehicle; the vehicle may be a front-wheel drive vehicle or a four-wheel drive vehicle) in response to driver's depression of an accelerator pedal. The steering device 20 is used to control the steering angle of the front wheels. A steering device for the rear wheels may be further provided. The braking system device generates braking force in each wheel. In an ordinary mode, the drive system device is configured to transmit driving torque or rotational force from an engine and/or an electric motor (not shown; the drive system device may be a hybrid drive device including both an engine and an electric motor) to the rear wheels 12RR, 12RL via a transmission (not shown) and a differential gear unit 14. When torque vectoring control for adjusting the distribution of driving force that is transmitted to the right and left wheels is executed, a right and left driving force distribution differential may be employed as the differential gear unit 14. The right and left driving force distribution differential is able to execute the torque vectoring control. The distribution of braking and driving force between the right and left wheels may be adjusted by independently adjusting the braking force of each wheel by the use of the braking system device (in this case, the differential gear unit 14 does not need to have a driving force distribution function). The drive system device may be an in-wheel motor-type drive device. In this case, braking and driving force that is generated in each of the right and left wheels is adjusted.

A power steering device may be employed as the steering device 20. The power steering device turns the front wheels 12FR, 12FL by transferring the rotation of a steering wheel 22 that is steered by a driver to tie rods 26R, 26L while the steering torque is being boosted by a booster 24. In driving assistance control according to the invention, as will be described later, a control command is issued to the booster 24, and a steering assist torque Ta is generated (steering assist mechanism). The steering assist torque Ta is determined by utilizing an actual steering angle θsw, a torque that acts on a steering shaft 22a, and the like, in an electronic control unit 50 (described later). Therefore, a sensor (not shown) that detects the steering angle θsw and a sensor 22b (FIG. 3B) that detects a torque that acts on the steering shaft 22a are provided. In addition, the driving assistance control according to the invention is configured as its basic concept to coordinate control based on driver input and control based on mechanical input with each other by causing a driver to sense steering assist torque to thereby guide driver's steering to more ideal steering. Therefore, in the configuration according to the present embodiment, a steering device in which a steering wheel and steered wheels (the right and left front wheels in the illustrated example) are mechanically coupled to each other is employed so that a state of torque in a yaw direction, generated in the steered wheels, is sensed by the driver through the steering wheel.

Furthermore, the vehicle 10 to which an embodiment of the driving assistance control apparatus according to the invention is applied may include an in-vehicle camera 40, a radar or other device 42 and a GPS device (car navigation system) 44. The in-vehicle camera 40 and the radar or other device 42 are used to detect conditions around the vehicle, such as a white line (or yellow line) on a road, another vehicle and an obstacle. The GPS device 44 acquires various pieces of information, such as information about the position of the host vehicle, by carrying out communication with GPS satellites.

Operation control over the above-described portions of the vehicle and operation control over the driving assistance control apparatus according to the invention are executed by the electronic control unit 50. The electronic control unit 50 may include an ordinary microcomputer and an ordinary drive circuit. The microcomputer includes a CPU, a ROM, a RAM and an input/output port device, which are coupled to one another by a bidirectional common bus. The configuration and operation of each unit of the driving assistance control apparatus according to the invention (described later) may be implemented by the operation of the electronic control unit (computer) 50 in accordance with a program. A torque To that acts on the steering shaft, the steering angle θsw, a yaw rate γ and/or lateral acceleration Yg from a gyro sensor 30, pieces of information s1 to s3 from the in-vehicle camera 40, the radar or other device 42, the GPS device 44, and the like, are input to the electronic control unit 50. In a mode (described later), control commands indicating the steering assist torque Ta, a controlled amount (for example, a driving force distribution ratio kr) for braking and driving force distribution control for the right and left wheels, and the like, are output to the corresponding devices. Although not shown in the drawing, various parameters that are required for various control that should be executed in the vehicle according to the present embodiment, for example, various detection signals, such as a longitudinal G sensor value and each wheel speed, may be input and then various control commands may be output to corresponding devices. A display 32 may be provided. The display 32 is used to receive visual or audio information info. as to whether driving assistance control is being executed from the electronic control unit 50 and then provide the information info. to a driver.

Configuration of Driving Assistance Control Apparatus

Figure 1B:
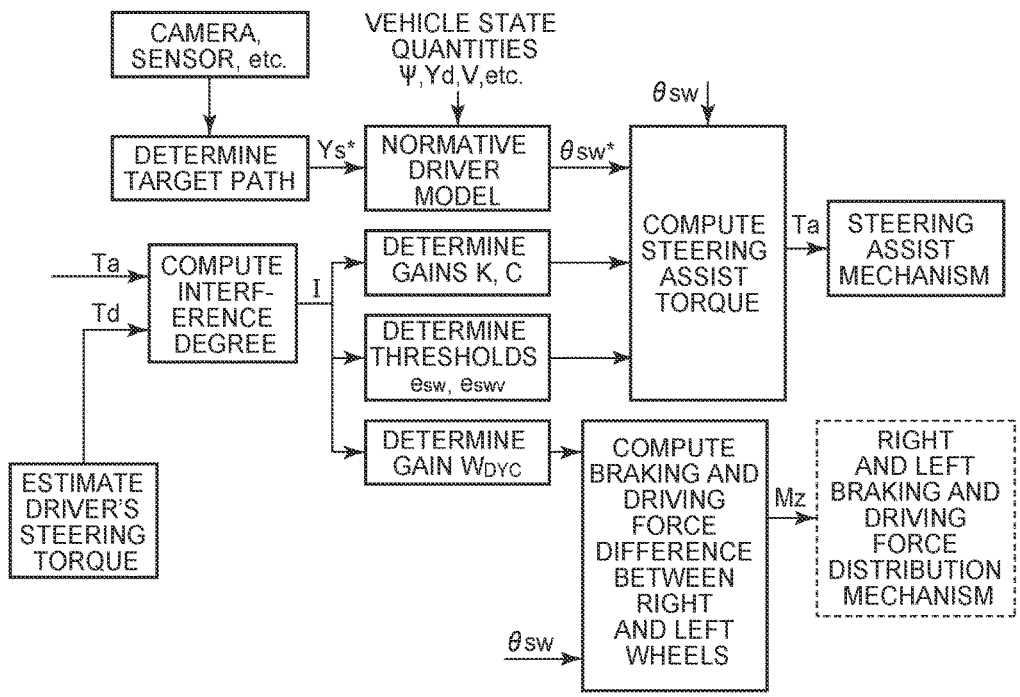
FIG. 1B is a block diagram of a system including the embodiment of the driving assistance control apparatus for a vehicle according to the invention.

As shown in FIG. 1B, in a specific configuration of the driving assistance control apparatus according to the invention, a target path determination unit determines a target path. The target path is determined such that driving of the vehicle is further optimally achieved by using vehicle surrounding information, information about a geometric line form of road, or the like, of a route or course and/or information about a suitable travel route (future trajectory). The vehicle surrounding information is, for example, information about the position of a road white line, the presence or absence and position of a vehicle ahead or an obstacle and a direction in which a road extends. The geometric line form of road, or the like, of a route or course is obtained from the GPS device, or the like. The suitable travel route is set for a destination desired by a driver. The target path determination unit further determines a target lateral displacement (mechanical target lateral displacement) Ys* for causing the vehicle to move along the target path. The target lateral displacement Ys* is input to a normative driver model unit. In the mode that will be described in detail later, the normative driver model unit determines a target steering angle θsw* by using the target lateral displacement Ys* and index values indicating the current state of the vehicle, such as a lateral displacement Yd of the vehicle, a yaw rate γ, a yaw angle Ψ and a vehicle speed V. A steering assist torque computing unit determines a steering assist torque Ta by using the target steering angle θsw*, an actual steering angle θsw, gains K, C, and dead band thresholds esw, eswv. A control command that achieves the steering assist torque Ta is issued to the steering device.

In the driving assistance control, when braking and driving force distribution control for the right and left wheels is utilized, a right and left wheel braking and driving force difference computing unit calculates a target yaw moment Mz that should be generated through a difference in braking and driving force between the right and left wheels by using the actual steering angle θsw and a gain $W_{DYC}$, and a control command for applying the target yaw moment Mz is transmitted to a right and left wheel braking and driving force distribution mechanism. The control command here is a control command indicating the driving force distribution ratio kr that should be generated by the right and left driving force distribution differential when the target yaw moment Mz is generated through torque vectoring control by adjusting the distribution of driving force. The control command here is a control command that should be generated in each wheel braking device when the target yaw moment Mz is generated by a difference in braking force in the wheel braking devices.

In the above description, the gains K, C and dead band thresholds esw, eswv that are referenced by the steering assist torque computing unit and the gain $W_{DYC}$ that is referenced by the right and left wheel braking and driving force difference computing unit are respectively determined in the corresponding determination units on the basis of an interference degree I that indicates the driving skill level of a driver. The interference degree I, as will be described in detail later, is determined on the basis of a steering assist torque Ta in a past predetermined period and a steering torque (driver's steering torque) Td applied by the driver. The driver's steering torque Td is typically a value estimated by using a detected torque To that acts on the steering shaft 22a.

Principle of Driving Assistance Control According to Invention (1) Concept of Steering Assist Torque and Arithmetic Expression In brief, one goal of the driving assistance control over the vehicle according to the invention is to set a target path that is one of ideal paths for the vehicle by using the vehicle surrounding information and then control the steering angle such that the vehicle is caused to travel along the target path by performing ideal steering (any ideal path may be set, and one or more of the ideal paths can be presumed depending on, for example, a point on which importance is placed in traveling of the vehicle (travel time, consumption energy, safety, or the like)). In this control, more specifically, as described above, after the target path is set, the steering angle (target steering angle θsw*) is determined in the case where the target lateral displacement Ys* that is required to cause the vehicle to move along the target path is achieved by a driver model that performs ideal or normative driving (normative driver model), and the actual steering angle θsw is adjusted to the target steering angle θsw*. When control over the steering angle is executed only by steering caused by the driving assistance system, that is, only by control based on mechanical input, as described in the chapter of "SUMMARY OF THE INVENTION", driver's intention is not reflected in the movement of the vehicle at all. Particularly, if the driver does not understand an intention (the direction and amount of controlled behavior) of mechanical input or the operation of control based on mechanical input is different from driver's assumption or expectation, the driver experiences a strong feeling of strangeness. In order to avoid such a situation, in the invention, while a state where steering input by a driver (driver input resulting from rotation of the steering wheel) is reflected in the movement of the vehicle, that is, a state where control based on driver input (driver's steering torque) and control based on mechanical input (steering assist torque) can be executed at the same time, is maintained, driver input is guided to match an intension of control based on mechanical input by causing the driver to sense the intension of control based on mechanical input. Thus, the steering angle is controlled to adjust the actual steering angle θsw to the target steering angle θsw* by coordinating control based on driver input and control based on mechanical input with each other.

As the above-described configuration for coordinating control based on driver input and control based on mechanical input with each other, particularly, in the driving assistance control according to the invention, as described above, the steering device in which the steering wheel that is gripped by a driver and the steered wheels are mechanically directly coupled to each other is employed, and the steering assist torque Ta that varies with a deviation θsw*-θsw (steering angle deviation) between the target steering angle θsw* and the actual steering angle θsw and that acts in a direction to reduce the steering angle deviation is applied in a direction in which the actual steering angle θsw is brought close to the target steering angle θsw* (determined on the basis of mechanical input) with the use of the steering assist mechanism in the steering device. When the steering assist torque Ta is applied to the steering device, the steering assist torque Ta is transferred to the steering wheel 22 via the steering shaft 22a. As a result, the direction and magnitude of the steering assist torque Ta are sensed by the driver through a feel of hand gripping the steering wheel 22 as rotational force that pulls in the target steering angle direction. Thus, the driver recognizes control based on mechanical input, that is, the direction of control that achieves a more ideal driving state, so it is expected that, with the aid of the steering assist torque Ta, steering torque (driver's steering torque Td) following the steering assist torque Ta is applied through rotation of the steering wheel 22. As the actual steering angle approaches the target steering angle, the steering assist torque Ta reduces. As the actual steering angle reaches the target steering angle, the steering assist torque Ta becomes zero. Therefore, the driver is allowed to bring the actual steering angle to the target steering angle by adjusting steering torque that is applied by the driver with the aid of the magnitude of the steering assist torque Ta. That is, the steering assist torque Ta is an assist torque that is applied in order to displace the steering angle, while, at the same time, the steering assist torque Ta is an index for the direction of control and the magnitude of controlled amount, which are required to change the actual steering angle to the target steering angle, and the steering assist torque Ta performs the function of guiding the driver's steering torque Td in a direction to match the steering assist torque Ta. Thus, the actual steering angle is caused to match the target steering angle as a result of coordinated action of the steering assist torque Ta with the driver's steering torque Td.

Preferably, the steering assist torque Ta may include a component (second component) that varies with a deviation dθsw*/dt−dθsw/dt (steering angular velocity deviation) between the rate of change dθsw*/dt in target steering angle and the rate of change dθsw/dt in actual steering angle and that acts in a direction to reduce the steering angular velocity deviation. This component increases as the steering angular velocity deviation increases. Therefore, when there is a deviation between the rate of change in actual steering angle and the rate of change in steering angle in the case of more ideal driving of the normative driver model, the steering assist torque Ta changes in a direction to correct the deviation. Therefore, in this case, the driver is allowed to cause the actual steering angle to match the target steering angle and cause the rate of change in steering angle to follow the rate of change in ideal steering angle by performing steering with the aid of the magnitude of the steering assist torque Ta such that the steering assist torque Ta reduces.

Figure 2:
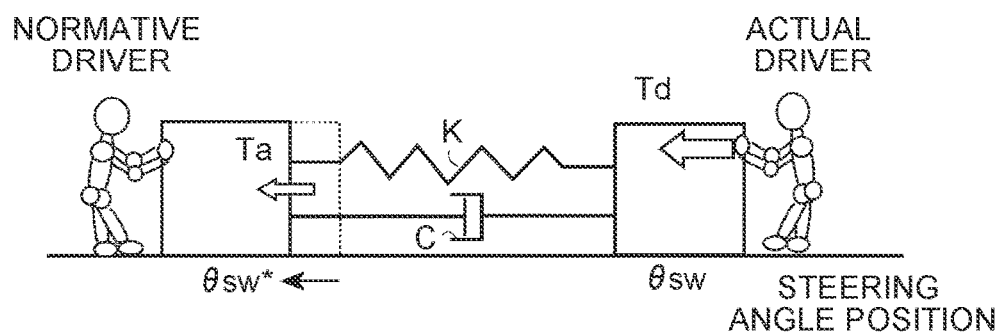
FIG. 2 is a view that illustrates the concept of guiding a driver to perform steering in driving assistance control according to the invention.

FIG. 2 is a conceptual view that abstractively shows the concept of the above-described control, that is, control for bringing the actual steering angle to the target steering angle by executing control based on mechanical input and control based on driver input in a coordinated manner. As shown in the drawing, the left-side block represents the position of the target steering angle θsw* by a normative driver, and the right-side block represents the position of the actual steering angle θsw by an actual driver (in actual steering device, before the target steering angle θsw* is displaced, the target steering angle θsw* and the actual steering angle θsw coincide with each other; however, for the sake of illustration, both are drawn so as to be spaced apart from each other), and the two blocks are coupled to each other by a spring K and/or a damper C. The elastic force of the spring K is a component (first component) that is applied as a result of the steering angle deviation of the steering assist torque Ta. The viscous force of the damper C is a component (second component) that is applied as a result of the steering angular velocity deviation of the steering assist torque Ta. In the configuration as shown in the drawing, for example, when the left-side normative driver in the drawing has displaced the target steering angle θsw* leftward (in the drawing, when the left-side block has moved from the dotted-line position to the continuous-line position), a deviation between the target steering angle θsw* and the actual steering angle θsw increases, with the result that the steering assist torque Ta is generated leftward. The steering assist torque Ta corresponds to a reaction force that occurs as a result of extension of the spring K and/or the damper C in the drawing. As a result, the reaction force of the spring K and/or the damper C, that is, the steering assist torque Ta, pulls the right-side actual driver block, so the driver is allowed to sense a change in steering angle and the rate of the change in normative driver's driving on the basis of the direction and magnitude of the reaction force. Thus, the driver is allowed to apply the driver's steering torque Td such that the driver's steering torque Td follows the steering assist torque Ta, that is, the steering assist torque Ta becomes zero (such that the driver feels no reaction force). As the right-side block that represents the actual steering angle θsw moves under the steering assist torque Ta and the driver's steering torque Td by the displacement of the target steering angle θsw*, extension of the spring K and/or the damper C disappears, so the steering assist torque Ta becomes zero, and, at the same time, the driver stops applying the driver's steering torque Td.

In this manner, in the above-described control, the steering assist torque Ta acts in a direction to reduce the steering angle deviation θsw*−θsw and/or the steering angular velocity deviation dθsw*/dt−dθsw/dt, and performs the function as an index of the direction and magnitude of control based on mechanical input for a driver. The driver applies the driver's steering torque Td following the steering assist torque Ta with the aid of the steering assist torque Ta such that the steering assist torque Ta becomes zero. Thus, control for bringing the actual steering angle into coincidence with the target steering angle or control for bringing the steering angular velocity into coincidence with an ideal velocity is achieved.

The steering assist torque Ta is specifically expressed by any one of the following mathematical expressions.

$$Ta=K(\theta sw^*-\theta sw) \quad (1), or$$

$$Ta=K(\theta sw^*-\theta sw)+C(d\theta sw^*/dt-d\theta sw/dt) \quad (2)$$

Here, K is a gain (which corresponds to the elastic modulus of the spring in FIG. 2) for the steering angle deviation, and C is a gain (which corresponds to the damping coefficient of the damper shown in FIG. 2) for the steering angular velocity deviation. As will be described below, when a dead band is provided for the steering assist torque Ta, the above-described mathematical expressions are further revised.

(2) Adjustment of Steering Assist Torque in Response to Driving Skill Level

When driver input is guided to mechanical input by applying the steering assist torque Ta as described above, whether a driver is able to perform steering following steering of the normative driver model depends on the driving characteristic of the driver, particularly, the driving skill level. Actually, a driver having a high driving skill level is able to adjust the actual steering angle θsw to the target steering angle θsw* quickly following the steering assist torque Ta; whereas a driver having a low driving skill level is expectedly not to be able to skillfully adjust the actual steering angle θsw to the target steering angle θsw* so much. This will be described with reference to the conceptual view of FIG. 2. At the time when the target steering angle has changed, a driver having a high driving skill level is able to immediately bring the actual steering angle into coincidence with the target steering angle even when reaction force is small; however, for a driver having a low driving skill level, it is more advantageous to increase the action of guiding the actual steering angle to the target steering angle by increasing reaction force. In the driving assistance control according to the invention, using the steering assist torque Ta, the driving skill level of a driver is further evaluated during traveling of the vehicle, and the steering assist torque Ta is adjusted to be larger as the driving skill level becomes lower.

Various methods of evaluating the driving skill level of a driver are conceivable. Particularly, in the invention, a value called an interference degree, which is calculated on the basis of the magnitude of a difference (steering torque deviation) between the steering torque applied by the driver through the steering wheel (driver's steering torque) and the steering assist torque Ta, is defined as an index value of the driving skill level. In the above description, for example, as can be understood from the description related to FIG. 2, as a driver has a higher driving skill level, the followability of the actual steering angle to the target steering angle becomes higher, and the steering torque deviation reduces; whereas, as a driver has a lower driving skill level, the steering torque deviation increases. Thus, the driving skill level can be evaluated on the basis of the magnitude of the steering torque deviation (see the following notes). In the invention, the interference degree is calculated as an index value of the driving skill level that is determined on the basis of the magnitude of the steering torque deviation, and the magnitude of the steering assist torque Ta is adjusted by using the interference degree. The index value of the driving skill level, that is, the interference degree, needs to be already obtained at the time of applying the steering assist torque Ta through the driving assistance control according to the invention, so the interference degree is determined by using the magnitude of the steering torque deviation in the past, that is, at a point in time before the steering assist torque Ta is applied at each point in time during execution of control. The driving skill level cannot be accurately evaluated on the basis of only the instantaneous magnitude of the steering torque deviation at only one point in time, so the interference degree may be calculated by using the history of the steering torque deviation over a selected period. As the driving skill level decreases, that is, as the interference degree increases, the usability of the driving assistance control increases, so the gains K, C are increased.

Specifically, the interference degree may be computed by, for example, the following mathematical expression.

$$I=\int (Td-Ta)^2 dt \quad (3)$$

Here, an integral interval may be a selected past period, and, as will be described later, may be, for example, set in various modes depending on timing at which the driving assistance control according to the invention is executed.

(Notes) More strictly, in the control according to the invention, in consideration of the action of self-aligning torque (described later), the actual steering angle θsw is controlled by using the total sum (Ta+Td+$T_{SAT}$) of the steering assist torque, the driver's steering torque and the self-aligning torque (the self-aligning torque constantly acts in a direction to reduce the turning angle). Where a torque Tid (ideal steering torque) that is applied in the case of steering angle control by the normative driver is assumed, control using both the steering assist torque and the driver's steering torque corresponds to control by the normative driver when Tid=Ta+Td+$T_{SAT}$. In this case, Ta does not always need to be equal to Td, and the ratio between Ta and Td may be selected. However, usually, the state where Tid=Ta+Td+$T_{SAT}$ is accurately achieved is rarely met, and typically the gains K, C are adjusted by adaptation for the steering assist torque Ta, and the steering assist torque Ta is set so as to be half the magnitude of the ideal steering torque. In the case of a driver having a high driving skill level, the driver's steering torque Td roughly coincides with the steering assist torque Ta, the actual steering angle is quickly roughly caused to match the target steering angle, the steering assist torque Ta is reduced, and the magnitude of the steering torque deviation Td-Ta reduces. On the other hand, as the driving skill level decreases, a deviation of the driver's steering torque Td from the steering assist torque Ta increases, and a longer time is required until the actual steering angle roughly matches the target steering angle, so the magnitude of the steering torque deviation Td-Ta increases. Therefore, the driving skill level is allowed to be evaluated on the basis of the interference degree.

(3) Setting Dead Band of Steering Assist Torque Ta

As expressed by the mathematical expression (1) or (2), when the steering assist torque Ta is set so as to vary with the steering angle deviation or the steering angular velocity deviation, the actual steering angle is close to the target steering angle in a range in which the absolute value of the steering angle deviation or the absolute value of the steering angular velocity deviation is small, so the necessity of the steering assist torque Ta is relatively reduced. When the steering angle deviation or the steering angular velocity deviation is around zero, the width of adjustment of the steering angle is minute, so it is slightly difficult for a driver to accurately adjust the actual steering angle to the target steering angle through the steering wheel, and driver input becomes excessive near zero deviation, with the result that hunting is easier to occur. In the driving assistance control according to the invention, the dead band of the steering assist torque Ta for the steering angle deviation or the steering angular velocity deviation may be provided in the range in which the absolute value of the steering angle deviation or the absolute value of the steering angular velocity deviation is small, and, when the absolute value of the steering angle deviation or the absolute value of the steering angular velocity deviation is smaller than or equal to a predetermined threshold, the steering assist torque Ta may be set to zero. In terms of this point, easiness of occurrence of hunting near zero deviation naturally depends on the driving skill level of a driver, so the width of the dead band may be determined on the basis of the above-described interference degree. In this case, as the driving skill level decreases (as the interference degree increases), the range in which the steering angle is hard to be accurately adjusted expands, so the width of the dead band may be increased as the interference degree increases. In this manner, when the dead band is provided in the above-described mathematical expression (1) or (2), the expression for the steering assist torque is revised as (4) or (5) described below.

$$Ta = K(\theta sw^* - \theta sw - esw) \tag{4}$$

$$Ta = K(\theta sw^* - \theta sw - esw) + C(d\theta sw^*/dt - d\theta sw/dt - eswv) \tag{5}$$

Here, each of esw and eswv is the dead band threshold that defines the range of the dead band, and is determined on the basis of the interference degree.

(4) Reduction of Self-Aligning Torque Through Braking and Driving Force Distribution Control for Right and Left Wheels When the vehicle is steered to bring the turning angle of the wheels to a significant angle and, as a result, the tires create lateral force, self-aligning torque is generated in a direction to reduce the turning angle. That is, self-aligning torque acts as drag when the actual steering angle is increased, and acts as thrust when the actual steering angle is reduced. In the driving assistance control according to the invention as well, in the case where the vehicle is turned only by steering the front wheels, when there is self-aligning torque, a driver needs to apply steering torque in consideration of the self-aligning torque in process of displacing the actual steering angle to the target steering angle, so adjustment of steering torque by the driver can be complicated. The steering assist torque is determined on the basis of the steering angle deviation and/or the steering angular velocity deviation, so the magnitude of the steering assist torque does not include a component for cancelling out the self-aligning torque.

Incidentally, when yaw moment is generated in the vehicle through braking and driving force distribution control (direct yaw moment (DYC) control) for the right and left wheels not by the turning angle of the wheels, the above-described self-aligning torque of the tires is reduced. Therefore, in the driving assistance control according to the invention, preferably, adjustment of the driver's steering torque at the time when the driver performs steering following the steering assist torque may be made easier by reducing the action of the self-aligning torque as a result of applying yaw moment in the direction in which the vehicle turns by using DYC control at the time when the vehicle turns.

The reason why the self-aligning torque $T_{SAT}$ of the tires is reduced through DYC control is as follows. When only a steady characteristic is considered in a two-wheel model of a vehicle having a weight of m, the equation of motion at a lateral acceleration $a_y$ is given as follows.

$$ma_y = 2(Yf + Yr) \tag{6a}$$

$$2l_f Yf - 2l_r Yr + Mz = 0 \tag{6b}$$

Here, Yf, Yr, $l_f$, $l_r$, Mz respectively denote a front wheel cornering force, a rear wheel cornering force, a distance between the center of gravity of the vehicle and a front wheel axis, a distance between the center of gravity of the vehicle and a rear wheel axis and yaw moment caused by a difference in braking and driving force between the right and left wheels. On the other hand, where the complicated action of a suspension mechanism is ignored, the self-aligning torque $T_{SAT}$ of the tires is expressed as follows.

$$T_{SAT} = -2\xi Yf/n \tag{7}$$

Here, ξ, n respectively denote a caster offset and a steering gear ratio. In this manner, when the mathematical expressions (6a), (6b) and (7) are organized, the self-aligning torque $T_{SAT}$ is expressed as follows.

$$T_{SAT} = -\xi/\{n(l_f + l_r)\}(ml_r a_y - Mz) \tag{8}$$

Therefore, it is understood that the self-aligning torque $T_{SAT}$ is reduced by applying yaw moment Mz caused by a difference in braking and driving force between the right and left wheels.

As for the yaw moment Mz that is applied in actual control, in a simple vehicle movement model, it may be considered that the lateral acceleration $a_y$ is proportional to the actual steering angle θsw, so the yaw moment Mz may be obtained by the following mathematical expression such that the value in the last parentheses on the right-hand side of the mathematical expression (8) reduces.

$$Mz = K_{mz}\theta sw \tag{9}$$

$K_{mz}$ may be empirically or theoretically set. As in the case of the steering assist torque, the yaw moment Mz may be varied in response to the driving skill level of a driver. In this case, the yaw moment Mz may be obtained as follows.

$$Mz = W_{DYC} K_{mz} \theta sw \tag{9}$$

$W_{DYC}$ denotes a gain for the yaw moment Mz. As the interference degree increases, $W_{DYC}$ is set to a larger value.

Operation of Driving Assistance Control According to Invention (1) Execution Timing of Driving Assistance Control The driving assistance control may be executed by the driving assistance control apparatus according to the invention at any selected timing during traveling of the vehicle. As one mode, during traveling of the vehicle, the driving assistance control may be configured to be continuously executed in accordance with a driver's command (continuous execution mode). As another mode, the driving assistance control may be configured to be executed only in a specific situation, such as when an obstacle to be avoided has been detected in a traveling direction during traveling of the vehicle (intermittent execution mode, see FIG. 6A).

(2) Specific Process in Driving Assistance Control

Referring back to FIG. 1B, in a specific process that is executed in the driving assistance control according to the invention, initially, the target path determination unit determines a target path by using vehicle surrounding information and then determines a target lateral displacement (mechanical target lateral displacement) Ys* for causing the vehicle to move along the target path. The normative driver model unit determines a target steering angle θsw* that achieves the mechanical target lateral displacement Ys* by referencing the mechanical target lateral displacement Ys* and the current state of movement of the vehicle. The target steering angle θsw* may be, for example, determined by the following expression in accordance with the forward gaze model.

$$\theta sw^* = \frac{h^*}{1 + Tn^* \cdot s}\{Ys^* - (Yd + Tp^*V\psi)\} \quad (10)$$

Figure 3A:
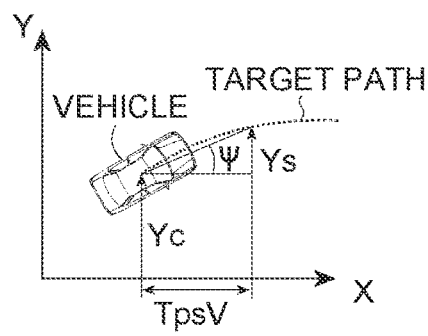
FIG. 3A is a top view of a moving vehicle for illustrating parameters in a forward gaze model that is used as a normative driver model.

Here, h*, Tn*, Tp* respectively denote a steering gain, a first-order lag time constant and a forward gaze time that represent the driving characteristic of the normative driver model, and s denotes a frequency variable after Laplace transform. Yd, Ψ, V respectively denote the current lateral displacement (lateral position) of the vehicle, a yaw angle and a vehicle speed. The vehicle speed V may be, for example, a value obtained from wheel speed values obtained by wheel speed sensors with the use of a selected technique. As is schematically drawn in FIG. 3A, the target lateral displacement Ys*, the lateral displacement Yd of the vehicle and the yaw angle Ψ may be values measured from a selected reference point and a selected reference direction. When a reference point and a reference direction are set for the vehicle, the lateral displacement Yd of the vehicle and the yaw angle Ψ each become zero, and the target lateral displacement Ys* is a distance from the current position to a lateral position that should be reached after the forward gaze time. In the above mathematical expression, h*, Tn*, Tp* are driving characteristic values of a driver in the case where the driver makes an ideal response in driving the vehicle, and may be selectively set by experiment, or the like, in advance. The target steering angle θsw* is calculated in accordance with the normative driver model as already described above, so the target steering angle θsw* is a value that the actual steering angle should be caused to match in the case where the vehicle ideally travels along the target path.

When the target steering angle θsw* is determined, the steering assist torque computing unit calculates a steering assist torque Ta by using the mathematical expression (4) or (5), and issues a control command for generating the steering assist torque Ta to the booster 24. Whether to use any one of the mathematical expression (4) and the mathematical expression (5) may be freely selected by a manufacturer of the apparatus or a driver. In the mathematical expression (4) or (5), a detected value of a steering angle sensor (not shown) provided at the steering shaft 22a, or the like, may be used as the actual steering angle θsw.

Figure 3B:
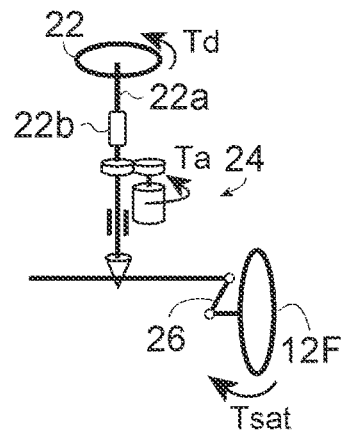
FIG. 3B is a schematic view that illustrates torques that act on a steering device.

As described above, the gains K, C and the dead band thresholds esw, eswv in the mathematical expression (4) or (5) are determined by using the interference degree I that is calculated through the mathematical expression (3), and the interference degree I is a value obtained by integrating a steering torque deviation (a difference between the steering assist torque Ta and the driver's steering torque Td) over a past selected period. In the mathematical expression (3), the driver's steering torque Td may be, for example, estimated from a detected value of the torque sensor 22b attached to the steering shaft 22a as illustrated in FIG. 3B. More specifically, the detected value of the torque sensor 22b is a torque value To that is acting in the steering shaft 22a. In brief, as for the detected torque value To, the following relational expression holds among the steering assist torque Ta, the driver's steering torque Td and the self-aligning torque $T_{SAT}$.

$$To = Ta + Td + T_{SAT} \quad (11)$$

Therefore, the steering assist torque Ta and the self-aligning torque $T_{SAT}$ are respectively calculated by the mathematical expression (4) or (5), and the mathematical expression (8), so the driver's steering torque Td is allowed to be estimated as follows.

$$Td = To - (Ta + T_{SAT}) \quad (12)$$

Actually, filtering, or the like, that removes noise from the detected torque value To is applied, and then the driver's steering torque Td is estimated.

In the case of the continuous execution mode in which the driving assistance control is continuously executed during traveling of the vehicle, an integral period (that is, the above-described past selected period) of the steering torque deviation in the mathematical expression (3) may be a period previous to the present time, and the interference degree I may be calculated by sequential integrating the steering torque deviation. On the other hand, in the case of the intermittent execution mode in which the driving assistance control is executed only in a specific situation, the integral period of the steering torque deviation for execution of the driving assistance control that is started at a certain point in time may be a period during previous execution of the driving assistance control, and the interference degree I may be calculated by integrating the steering torque deviation over the period during previous execution of the driving assistance control.

Figure 4A:
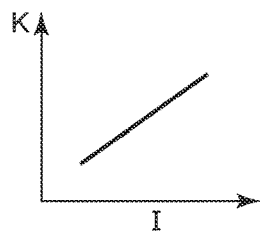
FIG. 4A is a graph that shows a map of a gain K of steering assist torque, which is set for an interference degree I.
Figure 4B:
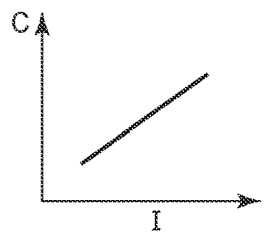
FIG. 4B is a graph that shows a map of a gain C of steering assist torque, which is set for an interference degree I.
Figure 4C:
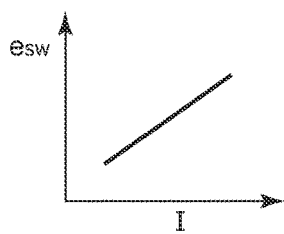
FIG. 4C is a graph that shows a map of a dead band threshold esw that is set for an interference degree I.
Figure 4D:
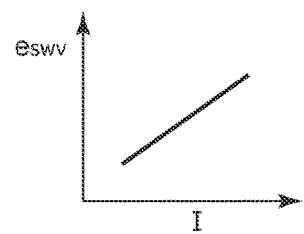
FIG. 4D is a graph that shows a map of a dead band threshold eswv that is set for an interference degree I.
Figure 4E:
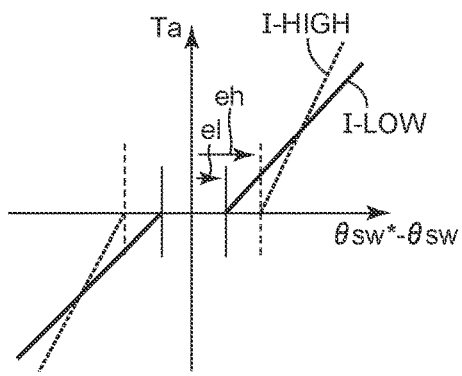
FIG. 4E is a graph that shows the relationship between a steering angle deviation and a steering assist torque in driving assistance control according to the invention.

As illustrated in FIG. 4A to FIG. 4D, specific values of the gains K, C and dead band thresholds esw, eswv may be determined by using prepared maps that show gains K, C and dead band thresholds esw, eswv for an interference degree I. As is understood from these maps, the gains K, C and the dead band thresholds esw, eswv each are increased with the interference degree I, so, as schematically drawn in FIG. 4E, in comparison with the case where the interference degree I is small and the driving skill level is high (the continuous line in the drawing), the ratio of the steering assist torque Ta to the steering angle deviation (or the steering angular velocity deviation) is increased as the interference degree I increases or as the evaluated driving skill level decreases (the dotted line in the drawing). As for the width of the dead band of the steering assist torque Ta as well, a width eh in the case where the interference degree I is large is expanded as compared to a width el in the case where the interference degree I is small. In FIG. 4E, for the sake of description, the abscissa axis represents only the steering angle deviation; however, it should be understood that the steering assist torque Ta similarly varies with the steering angular velocity deviation.

When the self-aligning torque is reduced by generating yaw moment Mz through DYC control together with applying the steering assist torque Ta, the right and left braking and driving force difference computing unit calculates a yaw moment Mz, which should be generated, by using the mathematical expression (9), and calculates target braking and driving forces Fxrr, Fxrl of the right and left rear wheels that are non-steered wheels of the vehicle by using the calculated yaw moment Mz.

$$Fxrl=(\tfrac{1}{2})ma_x-Mz/d \tag{13a}$$

$$Fxrr=(\tfrac{1}{2})ma_x+Mz/d \tag{13b}$$

Figure 5A:
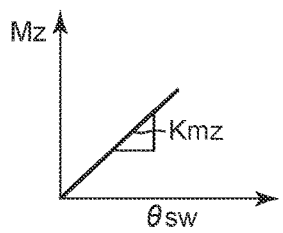
FIG. 5A shows a yaw moment Mz that is set for an actual steering angle in a braking and driving force distribution mechanism for right and left wheels in driving assistance control according to the invention.
Figure 5B:
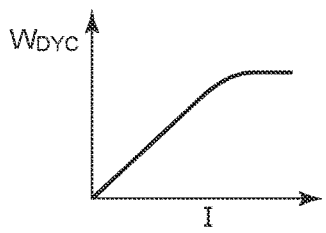
FIG. 5B is a graph that shows a map of a gain $W_{DYC}$ of the yaw moment Mz that is actually applied to the vehicle, the gain $W_{DYC}$ being set for an interference degree I.

Here, the yaw moment Mz is positive in a left turning direction, $a_x$ denotes the longitudinal acceleration of the vehicle, and d denotes a tread. In the mathematical expression (9), by using an interference degree I as in the case of the steering assist torque Ta, the gain $W_{DYC}$ may be determined by using a prepared map that shows a gain $W_{DYC}$ for an interference degree I as illustrated in FIG. 5B. The calculated target braking and driving forces Fxrr, Fxrl are transmitted to the right and left braking and driving force distribution mechanism, and braking and driving forces are respectively adjusted so as to coincide with the target braking and driving forces at the right and left wheels.

The gains K, C for calculating the steering assist torque Ta, the dead band thresholds esw, eswv and the gain $W_{DYC}$ for calculating the yaw moment Mz are set by using the interference degree I, and then preferably kept at set values for a certain period in order to ensure the stability of the steering assist torque Ta and yaw moment Mz. For example, in the case of the continuous execution mode in which the driving assistance control is continuously executed, the gains K, C, the dead band thresholds esw, eswv and the gain $W_{DYC}$ may be updated with reference to the interference degree I at intervals of a selected predetermined period. In the case of the intermittent execution mode in which the driving assistance control is executed only in a specific situation, the gains K, C, the dead band thresholds esw, eswv and the gain $W_{DYC}$ may be set by using the interference degree I calculated by using the steering torque deviation in previous execution of driving assistance control for executing the driving assistance control at a certain point in time, and then may be kept at the values set at the time of the start of execution during current execution of the driving assistance control (that is, updated each time the driving assistance control is executed).

Figure 6A:
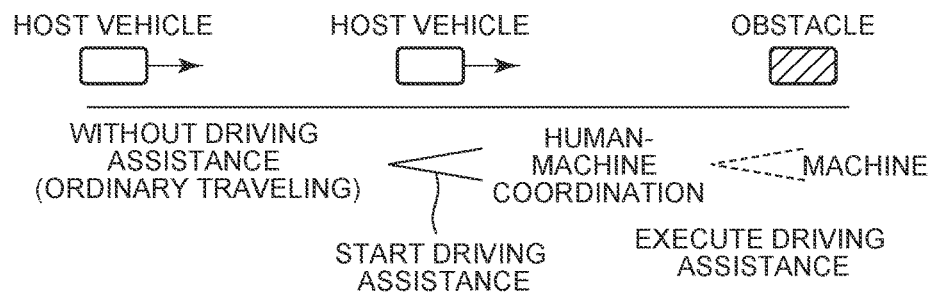
FIG. 6A is a view that illustrates a situation in which control for coordinating human with machine is executed in one mode of driving assistance control according to the invention.

Particularly, when the driving assistance control according to the invention is executed only in a specific situation, such as when an obstacle has been detected in the traveling direction of the vehicle, as is schematically shown in FIG. 6A, when the host vehicle is sufficiently apart from the obstacle, the driving assistance control is not executed, and the driver performs steering so as to cause the vehicle to travel ordinarily; whereas, when the host vehicle is slightly close to the obstacle, the driving assistance control (coordinated control) according to the invention is executed. When the host vehicle gets further close to the obstacle, control based on only mechanical input may be executed without accepting driver input. In this case, mechanical coupling between the steering wheel and the steered wheels is released.

Figure 6B:
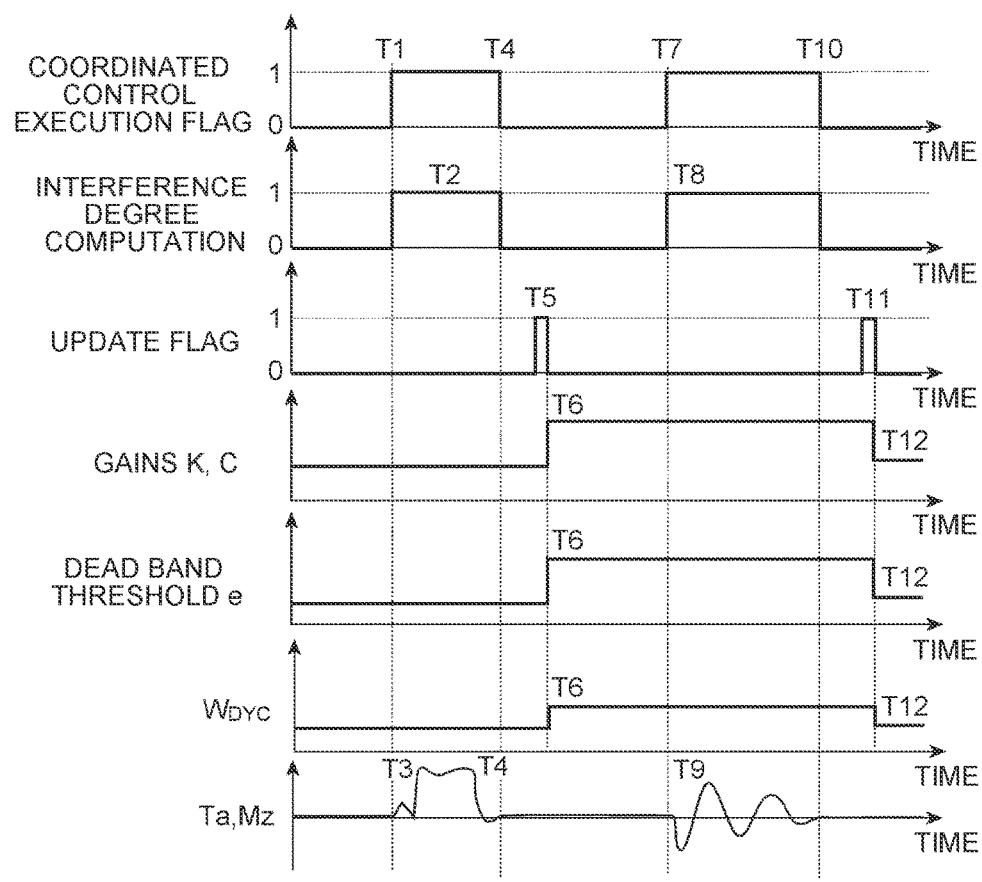
FIG. 6B is an example of the timing chart of each parameter in the case where control for coordinating human with machine is executed.

As described above, when the host vehicle gets slightly close to the obstacle (before the host vehicle gets close to the obstacle as shown at the right side in FIG. 6A), and when the driving assistance control (coordinated control) according to the invention is executed, parameters that are used in the control, for example, vary as schematically illustrated in FIG. 6B. In the following description, a coordinated control execution flag and an update flag are index parameters for indicating the status of control in a control program. In this manner, in a stage in which the driving assistance control is executed in a specific situation, such as when the host vehicle is slightly close to an obstacle, the coordinated control execution flag is set (T1) (the value of the flag in the control apparatus changes from 0 to 1), and the assistance control apparatus is activated. While the coordinated control execution flag is set (while the flag is 1), the interference degree is computed by using the steering torque deviation during then (T2). While the coordinated control execution flag is set, the steering assist torque Ta and the yaw moment Mz that are calculated by using the gains K, C, the dead band thresholds esw, eswv and the gain $W_{DYC}$ determined by using the interference degree I that has been obtained till then are applied (T3). When no interference degree I has been computed at the time when driving of the vehicle is started and coordinated control is executed for the first time, selected gains and dead band thresholds, for example, set in correspondence with an average driving skill level, may be used to compute the steering assist torque Ta and the yaw moment Mz.

After that, as the distance between the host vehicle and the obstacle increases or the host vehicle passes by while avoiding the obstacle, the coordinated control execution flag is cleared (becomes 0), and the control apparatus ends applying the steering assist torque Ta and the yaw moment Mz (T4). As the coordinated control ends, the update flag is set (T5), and the gains K, C, the dead band thresholds esw, eswv and the gain $W_{DYC}$ may be updated by using the interference degree I obtained during execution of the coordinated control that has ended (T6). The update process may be executed at the start of execution of the next coordinated control (however, it is more advantageous to update the gains K, C, the dead band thresholds esw, eswv and the gain $W_{DYC}$ before the start of execution of the next coordinated control because computation load after the start of execution reduces).

After that, when the host vehicle is slightly close to an obstacle again, the coordinated control execution flag is set (T7), the interference degree I is computed (T8), and the steering assist torque Ta and the yaw moment Mz are applied (T9). The values updated in the last update process (T6) are used as the gains K, C, the dead band thresholds esw, eswv and the gain $W_{DYC}$ at that time. When the coordinated control execution flag is cleared (T10), the control apparatus ends applying the steering assist torque Ta and the yaw moment Mz. After that, the update flag is set at the appropriate time (T11), and then the update process for the gains K, C, the dead band thresholds esw, eswv and the gain $W_{DYC}$ is executed.

In this manner, with the series of configurations of the driving assistance control according to the invention, when the steering assist torque is applied so as to be sensed by a driver and then the driver steers the steering wheel so as to follow the steering assist torque, while the driver performs steering, travelling of the vehicle along a target path is achieved in accordance with control based on mechanical input. Therefore, control based on driver input and control based on mechanical input are coordinated with each other. The steering assist torque is adjusted on the basis of the interference degree that indicates the driving skill level of a driver, so it is possible to provide driving assistance adapted to the driving skill level of the driver. The interference degree is calculated on the basis of the steering torque deviation during traveling of the vehicle, so it is advantageous in that it is possible to provide driving assistance compatible with a change in the driving skill level of a driver while the driver is driving the vehicle. In the above configuration, in starting execution of the driving assistance control according to the invention and in executing the driving assistance control according to the invention, a driver may be visually or auditorily informed by the in-vehicle display 32 of the fact that the driving assistance control is being executed. With this configuration, a driver is allowed to understand whether the driving assistance control is being executed, so the understanding of the driving assistance control increases, and a feeling of strangeness is further reduced.

The above-described description is made in connection with the embodiment of the invention; however, many modifications and changes may be easily made by persons skilled in the art. The invention is not limited to only the illustrated embodiment. The invention is apparently applied to various devices without departing from the concept of the invention.

What is claimed is:

1. A driving assistance control apparatus for a vehicle including a steering assist mechanism in a steering device in which steered wheels and a steering wheel are mechanically directly coupled to each other, the driving assistance control apparatus comprising:
    a steering assist torque determination unit that determines a steering assist torque on the basis of a steering angle deviation, the steering angle deviation being obtained by subtracting an actual steering angle from a target steering angle, the target steering angle being determined irrespective of driver's steering so as to achieve a target path of the vehicle, the steering assist torque including a first component that varies with a variation in the steering angle deviation and that acts in a direction to reduce the steering angle deviation; and
    a steering assist torque control unit that controls the steering assist mechanism such that the steering assist torque is applied to the steering device, wherein
    the steering assist torque determination unit includes an interference degree determination unit and a first component ratio determination unit, the interference degree determination unit determines an interference degree on the basis of a magnitude of a steering torque deviation between the steering assist torque in a past predetermined period and a driver's steering torque applied by the driver of the vehicle, the interference degree increases as the magnitude of the steering torque deviation increases, the first component ratio determination unit determines the ratio of a magnitude of the first component of the steering assist torque to the steering angle deviation on the basis of the interference degree.

2. The driving assistance control apparatus according to claim 1, wherein
    when the magnitude of the steering angle deviation is smaller than a dead band threshold, the steering assist torque determination unit sets the first component of the steering assist torque to zero, and the dead band threshold is set on the basis of the interference degree.

3. The driving assistance control apparatus according to claim 1, wherein
    the ratio of the magnitude of the first component of the steering assist torque to the steering angle deviation at the time when the interference degree is large is increased as compared to when the interference degree is small.

4. The driving assistance control apparatus according to claim 1, wherein
    a dead band threshold at the time when the interference degree is large is increased as compared to when the interference degree is small.

5. The driving assistance control apparatus according to claim 1, wherein
    the steering assist torque includes a second component that varies with a variation in steering angular velocity deviation on the basis of the steering angular velocity deviation and that acts in a direction to reduce the steering angular velocity deviation, the steering angular velocity deviation is obtained by subtracting a rate of change in the actual steering angle from a rate of change in the target steering angle, and
    the steering assist torque determination unit includes a second component ratio determination unit that determines the ratio of a magnitude of the second component to the steering angular velocity deviation on the basis of the interference degree.

6. The driving assistance control apparatus according to claim 5, wherein
    the ratio of the magnitude of the second component to the steering angular velocity deviation at the time when the interference degree is large is increased as compared to when the interference degree is small.

7. The driving assistance control apparatus according to claim 1, wherein
    the vehicle includes a braking and driving force distribution mechanism for right and left wheels,
    the driving assistance control apparatus further comprises a right and left braking and driving force difference determination unit and a right and left braking and driving force difference control unit, the right and left braking and driving force difference determination unit determines a target braking and driving force difference between the right and left wheels for applying yaw moment to the vehicle in a direction of an actual turning angle on the basis of the actual steering angle, the right and left braking and driving force difference control unit controls the braking and driving force distribution mechanism for the right and left wheels such that the target braking and driving force difference between the right and left wheels is applied, and
    the target braking and driving force difference between the right and left wheels is determined on the basis of the interference degree.

8. The driving assistance control apparatus according to claim 7, wherein
    the yaw moment that is applied in accordance with the target braking and driving force difference between the right and left wheels at the time when the interference degree is large is increased as compared to when the interference degree is small.

9. The driving assistance control apparatus according to claim 1, wherein
    the target steering angle is a steering angle on an assumption that the target path of the vehicle is achieved by a normative driver model.

10. The driving assistance control apparatus according to claim 1, wherein the interference degree is an integral value of the magnitude or square of the steering torque deviation between the steering assist torque and the driver's steering torque applied by the driver of the vehicle in the past predetermined period.

\* \* \* \* \*